(12) United States Patent
Puranik

(10) Patent No.: US 8,838,869 B1
(45) Date of Patent: Sep. 16, 2014

(54) MULTI-PROTOCOL DATA BUS INTERFACE

(75) Inventor: Kiran S. Puranik, Fremont, CA (US)

(73) Assignee: Xilinx, Inc., San Jose, CA (US)

( * ) Notice: Subject to any disclaimer, the term of this patent is extended or adjusted under 35 U.S.C. 154(b) by 172 days.

(21) Appl. No.: 13/531,370

(22) Filed: Jun. 22, 2012

(51) Int. Cl.
*G06F 13/00* (2006.01)
(52) U.S. Cl.
USPC ............................ 710/315; 710/312; 710/313
(58) Field of Classification Search
USPC ......................................... 710/312, 313, 315
See application file for complete search history.

(56) References Cited

U.S. PATENT DOCUMENTS

| | | | | |
|---|---|---|---|---|
| 6,006,302 | A * | 12/1999 | Okazawa et al. | 710/306 |
| 7,447,827 | B2 * | 11/2008 | Chen et al. | 710/312 |
| 7,818,485 | B2 * | 10/2010 | Wang et al. | 710/309 |
| 8,122,177 | B1 | 2/2012 | Puranik | |
| 2005/0182881 | A1 * | 8/2005 | Chou et al. | 710/301 |
| 2005/0193171 | A1 * | 9/2005 | Bacchus | 711/118 |
| 2012/0166691 | A1 * | 6/2012 | Song et al. | 710/105 |
| 2013/0138866 | A1 * | 5/2013 | Asfur et al. | 711/103 |

* cited by examiner

*Primary Examiner* — Glenn A Auve
(74) *Attorney, Agent, or Firm* — LeRoy D. Maunu

(57) ABSTRACT

In one embodiment, a multi-protocol communication circuit is provided. The communication circuit includes a plurality of protocol bridge circuits, each configured to convert data between a first format and a respective second format corresponding to a respective communication protocol. A switch network provides routable connections between the protocol bridge circuits and one or more interface circuits. Each interface circuit is configured to convert data between the first format and a raw data format. Due to the common first format, an interface circuit may be configured for select ones of different communication protocols by routing data in the first format between the interface circuit and a protocol bridge circuit corresponding to the select one of the different communication protocols.

18 Claims, 5 Drawing Sheets

MULTI-PROTOCOL DATA BUS INTERFACE

FIELD OF THE INVENTION

An embodiment generally relates to data bus communication.

BACKGROUND

Programmable integrated circuits (ICs) may be programmed by a user to perform specified logic functions. One type of programmable IC, known as a field programmable gate array (FPGA), is very popular because of a superior combination of capacity, flexibility, time-to-market, and cost. Programmable ICs provide the flexible hardware solutions ideal for high performance parallel computing required for advanced digital communications and video applications. For many complex applications, there has been a recent trend to implement a portion of the design in software and a portion of the design in programmable logic. Many manufacturers, such as Xilinx, Inc., include embedded processor systems in a number of programmable integrated circuits.

Embedded processor systems often include operating memory, software instruction storage, input/output, and other components of a computer system. These systems are referred to as system on chip (SOC) solutions. In these systems, designers may implement complex functions in programmable logic to increase efficiency and throughput. This architectural combination gives an advantageous mix of serial and parallel processing, flexibility, and scalability, thereby enabling a more optimized system partitioning—especially in the areas of intelligent video, digital communications, machine systems, and medical devices.

Given the variety of options available to designers, a design may include several portions split between software and programmable logic of one or more integrated circuits. However, implementing a suitable arrangement for communication between different portions poses a challenge to designers. Data bus architectures provide a convenient method to communicate data between the various portions of a system as well as with external devices.

Data busses may be implemented with a number of different data bus protocols such as the Peripheral Component Interconnect (PCI), the Advanced Microcontroller Bus Architecture (AMBA) bus architectures, etc. Designers implement interface circuits to communicate data to and from the data bus in a manner compliant with the chosen data bus protocol. However, because different logic cores and processors may communicate in different bit formats, implementation of interface circuitry can be challenging. The complexity of the interface circuitry may be further compounded for applications in which multiple data bus protocols are employed. For instance, AMBA Advanced Extensible Interface (AXI4) may be used to communicate between different portions of a system on a first bus, and the PCI Express protocol may be used to communicate with external devices connected to an I/O port of the system. The AXI4 protocol is fully described in the AMBA 4.0 specification and PCI Express is fully described in the PCI Express Base Specification 3.0.

Use of programmable circuitry of a programmable IC to implement interface circuits provides a designer with the flexibility to implement different communication protocols in a programmable IC as required for different applications. However, programmable circuitry has some performance limitations, such as longer signal delays and lower gate counts. As a result, communication circuits implemented in programmable circuitry may not provide a sufficient level of throughput for some applications.

To provide higher throughput, some programmable ICs may include several application specific integrated circuits (ASICs) that implement various circuits that may be utilized as part of a circuit design. However, ASIC circuitry must be implemented in advance, and thus reduces the space available for programmable resources and thereby reduces the circuit design options that may be implemented using the programmable IC. For instance, some programmable ICs may implement interface circuits that support one communication protocol. Some other programmable ICs may implement multiple sets of communication circuits, supporting different communication protocols. However, space restrictions may limit the number of ASIC communication circuits that can be implemented for a given protocol. Further resources and space may be wasted for circuitry to support communication protocols that may not be fully utilized.

The disclosed embodiments may address one or more of the above issues.

SUMMARY

In one or more embodiments, a circuit is provided that is configurable to support a plurality of different communication protocols. The circuit includes a plurality of protocol bridge circuits. A first protocol bridge circuit is configured to convert data between a first format and a second format. A second protocol bridge circuit is configured to convert data between the first format and a third format. The second format corresponds to a first data bus protocol and the third format corresponds to a second data bus protocol. A switch network is coupled to the first and second protocol bridges. One or more interface circuits are coupled to the switch network. Each interface circuit is configured to convert upstream data received on a first data input of the interface circuit from a raw format into data having the first format and forward the first formatted data to a output of the interface circuit that is coupled to the switch network. Each interface is also configured to convert downstream data received on a second input of the interface circuit coupled to the switch network from the first format to the raw data format and forward the raw formatted data to a second output of the interface circuit.

In one or more other embodiments, a programmable IC is provided. The programmable IC includes a plurality of programmable resources and a plurality of programmable routing resources for inter-coupling the programmable resources. A plurality of interface circuits are coupled to the programmable resource and to the programmable routing resources. A switch network is connected to the plurality of interface circuits. A plurality of protocol bridge circuits including at least a first protocol bridge circuit and a second protocol bridge circuit, are coupled to the switch network. A first one of the protocol bridge circuits is configured to convert data between a first format and a second format. A second one of the protocol bridge circuits is configured to convert data between the first format and a third format. The second format corresponds to a first data bus protocol and the third format corresponds to a second data bus protocol. Each of the interface circuits is configured to convert upstream data received on a first data input of the interface circuit from a raw format into data having the first format, and forward the first formatted data to a output of the interface circuit that is connected to the switch network. Each interface is also configured to convert downstream data received on a second input of the interface circuit connected to the switch network from the first format to the raw data format, and forward the raw formatted data to a second output of the interface circuit.

In yet another embodiment, a method is provided. The method includes converting first data in a first raw format into upstream data in a first format; routing the upstream data in the first format to a particular one of a plurality of protocol bridges; converting, using the particular protocol bridge, the upstream data in the first format into first protocol data in a second format, the second format corresponding to a first data bus protocol; converting, using another protocol bridge, a second protocol data in a third format into downstream data in the first format, the third format corresponding to a second data bus protocol different from the first data bus protocol; and converting the downstream data in the first format into second data in a second raw format.

It will be appreciated that various other embodiments are set forth in the Detailed Description and Claims, which follow.

BRIEF DESCRIPTION OF THE DRAWINGS

Various aspects and advantages of the disclosed embodiments will become apparent upon review of the following detailed description and upon reference to the drawings, in which:

FIGS. 3-1 and 3-2 show data flow for first and second configurations of an example circuit, in accordance with one or more embodiments.

DETAILED DESCRIPTION

Connecting components and peripheral sub-circuits in a circuit design is a complex task. A data bus connection network consists of several interconnects which may communicate over a plurality of busses using several different communication protocols. In one or more embodiments, an efficient communication circuit is provided that is configurable to support multiple different communication protocols.

In one embodiment, the communication circuit is configured to convert data streams between a raw data format and a selected format of a plurality of supported communication protocol formats. The communication circuit includes a protocol bridge circuit for each of the supported communication protocol formats. Each protocol bridge circuit is configured to convert between a data format of the supported communication protocol and an intermediate format. Each of the protocol bridge circuits is configured to use the same intermediate format. An interface circuit is configured to convert between a raw data format and the intermediate format that is used by the protocol bridge circuits. The communication circuit includes a switch network that may be configured to route data in the intermediate format between the interface circuit and the protocol bridge circuits that are needed for a particular application.

Because the interface circuit converts raw data to an intermediate format that can be used by any of the protocol bridge circuits, this architecture allows multiple interface circuits to be implemented and later selected, via routing of the switch network, to perform data conversion using any of the communication protocols supported by the bridge circuits. This configurability improves the options available to a circuit designer for implementing different circuit designs. For hardwired implementations of the communication circuit in a programmable IC, the communication circuit provides a resource and space efficient implementation because each of interface circuits can be utilized by a circuit designer for any of the supported communication protocols. Furthermore, for implementations in programmable resources of a programmable IC, the configurability of the communication circuit can help reduce development time because code to implement the interface circuits can be reused without significant redesign that would typically be required to adapt to a new communication protocol.

Figure 1:
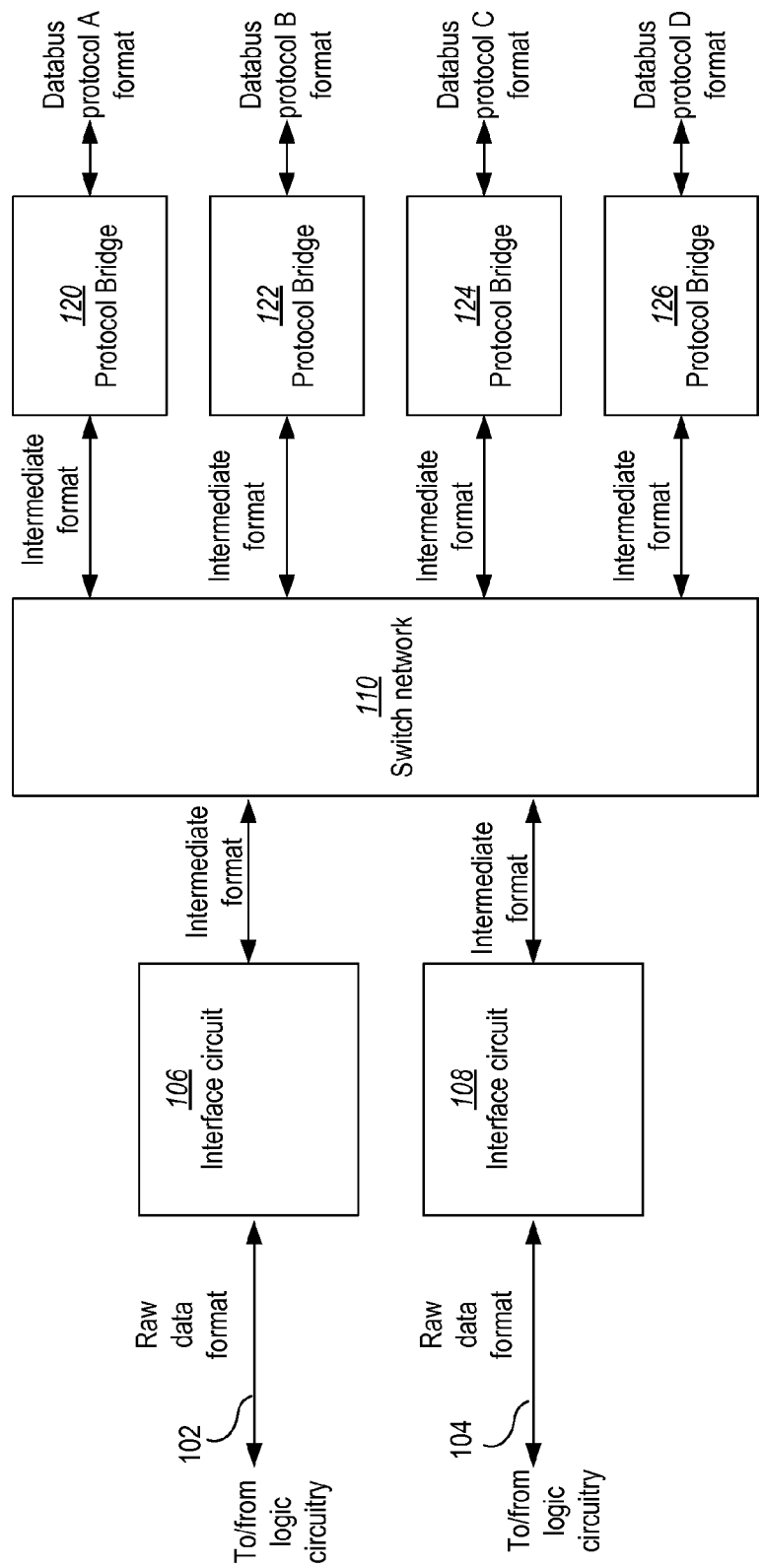
FIG. 1 shows a configurable circuit architecture for communicating data using a plurality of different data-bus protocols.

FIG. 1 shows a block diagram of a configurable communication circuit for communicating data using multiple different data-bus protocols. In this example, the communication circuit is configurable to convert two data streams 102 and 104 between respective raw data formats, used by logic circuits of a circuit design, and four supported communication protocol formats (A, B, C, and D). The circuit includes two interface circuits 106 and 108, each configured to convert respective data streams 102 and 104 between the corresponding raw format and a protocol-independent intermediate format. For instance, outgoing data produced by logic of a circuit design in data stream 102 may be packetized and formatted into the intermediate format by interface circuit 106.

Depending on the communication protocol (e.g., A, B, C, or D) used for communication of the data stream, switch network 110 can be configured to route the intermediate format data packets produced by the interface circuit 106 to an appropriate one of the protocol bridge circuits (120, 122, 124, and 126). For example, if upstream data in data stream 102 is to be communicated on a data bus using the protocol A format for a particular application, switch network 110 can be configured to route intermediate formatted data produced by interface circuit 106 to protocol bridge 120. As another example, if upstream data in data stream 102 is to be communicated on a data bus using the protocol format for a particular application, switch network 110 can be configured to route intermediate formatted data produced by interface circuit 106 to protocol bridge 122.

It is recognized that the communication circuit may be implemented to include any desired number of interface circuits and support any desired number of communication protocol formats. For ease of explanation, embodiments and examples are primarily described herein with reference to a circuit that supports AXI4 and PCI Express communication protocol formats.

For example, a programmable IC may implement an AXI4 protocol bridge to communicate between various logic/processing circuits of a circuit design (implemented using the programmable IC) and local memory spaces, and a PCI Express protocol bridge to communicate between the logic/processing circuits and remote memory spaces (e.g., external devices or memory). The PCI Express and AXI4 protocol bridges are configured to convert between the intermediate format and the respective PCI Express and AXI4 protocol formats. To enable protocol conversion, the intermediate format includes all header field information used by either of the PCI Express and AXI4 protocols. Thus, regardless of which protocol bridge intermediate data is forwarded to, the intermediate data can be converted to the corresponding protocol format for transmission on a data bus. Similarly, for downstream data, regardless of which protocol bridge downstream intermediate data is received from, the interface circuit may convert the intermediate formatted data to the raw data format. The common interface allows interface circuits to be used interchangeably for either PCI Express or AXI4 protocols, as required for a particular application.

In some embodiments, the interface circuits implement respective direct memory access (DMA) engines to facilitate communication between various circuits in a circuit design. In many computing and processing systems, DMA engines are used to handle processing associated with the transfers of data in the system with a high level of throughput. In such systems, the logic or processor of the system can initiate the transfer and continue with other processes while the transfer is being processed by the DMA engine. For example, various logic/processing circuits of a circuit design generate and/or receive streams of data via a data bus. Examples include audio, video, cryptographic, graphical, and compression codec streaming applications.

Streams generated or consumed by logic/processing circuits in such applications often do not contain any memory address information. Rather, the source and/or destination of the data contained in these streams are often either a local or a remote processing system. A DMA engine may be used to associate a particular destination memory address of a system with a particular data stream generated by a logic/processing circuit of the circuit design, and provide a processing system source address from which data can be retrieved by other processing/logic circuits in the circuit design. Current DMA schemes implement non-uniform streaming interfaces, and implement different configurations for communication using different communication protocols. Using the architecture shown in FIG. 1, one or more embodiments may implement interface circuits to perform DMA operations for a number of supported communication protocols.

Figure 2:
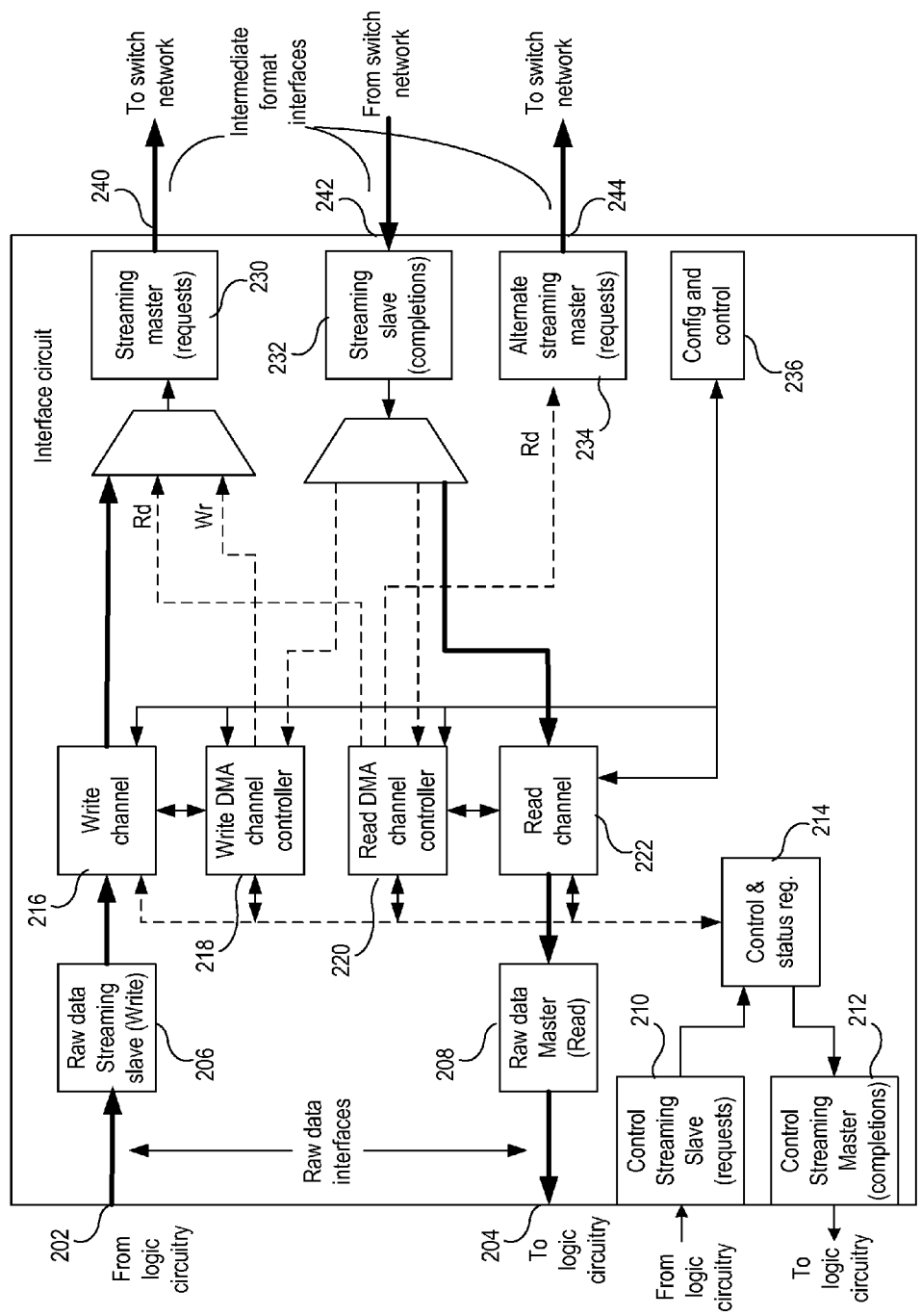
FIG. 2 shows a direct memory access (DMA) engine, that may be used to implement the interface circuit shown in FIG. 1.

FIG. 2 shows a DMA engine that may be used to implement one of the interface circuits in accordance with one or more embodiments. The DMA engine implements logic that converts data between a raw data format, which is used by logic/processing circuitry of a circuit design, and an intermediate format. As discussed above, the intermediate format is a communication protocol-independent format that is compatible with each of the protocol bridge circuits. The interface circuit is configured to convert upstream data received on a first data input 202 of the interface circuit from a raw format into an intermediate data stream having the intermediate format. The interface circuit forwards the intermediate data stream to an output (240 or 244) of the interface circuit connected to the switch network. The interface circuit is also configured to convert downstream data received on a second input 242 of the interface circuit, connected to the switch network, from the intermediate format to the raw data format used by the logic/processing circuitry of the circuit design. The interface circuit forwards the raw format downstream data to a second output 204 of the interface circuit that is connected to the logic/processing circuitry.

To improve configurability, in some embodiments, the DMA engine implements read and write descriptor rings that may be independently configured and processed. A write descriptor ring is used to buffer and process write commands to the DMA Engine. A read descriptor is used to buffer and process responses of completed read DMA commands.

In this example, data communication between the DMA engine and logic/processing circuitry of a circuit design is performed by a raw data master interface 208 and a slave interface 206. The master interface 208 is configured to send read data in the raw data format to the logic/processing circuitry, and the slave interface 206 is configured to receive write data in the raw data format from the logic/process circuitry. Control data for each write transaction is received on a control streaming slave interface 210, and control data for each completed read transaction is transmitted to the logic/process circuitry by a control streaming master interface 212. The control data for the upstream and downstream transactions is buffered in control and status registers 214. In this illustration, flow of control signals (read channel control, read channel request, write channel control, etc.) are depicted as dashed lines and flow of data packets are depicted as solid lines. In some other implementations, control data for each transaction may not be received from the logic/processing circuitry. For example, the DMA engine may be configured to receive raw data from the logic/processing circuit and automatically generate appropriate write transaction requests to transmit the data to a pre-configured destination.

Data communication between the DMA engine and the switch network is performed by a streaming master interface circuit 230 and a streaming slave interface circuit 232. The streaming master interface circuit 230 transmits intermediate formatted upstream data and read/write transaction requests to a switch network (e.g., 110). The streaming slave interface circuit receives intermediate formatted downstream data from the switch network. As discussed in more detail below, in some embodiments, read transaction requests may alternatively be transmitted to the switching network using an alternate streaming master interface circuit 234.

Upstream data is converted from the raw data format to the intermediate format by a write channel processor 216. Similarly, downstream data is converted from the intermediate format to the raw format by a read channel processor 222. Write DMA controller channel 218 and read DMA channel controller 220 coordinate processing of the upstream and downstream data based on status information stored in the control and status registers 214 for read and write transactions and control channel information (i.e. dashed lines) from the streaming slave interface 232.

The write DMA controller 218 and read DMA controller 220 may be configured by a configuration and control circuit 236 to provide read and write channels as required for a particular application. For instance, in one implementation, configuration and control circuit 236 is configured to program the write DMA controller 218 in response to a control signal indicating a destination address for the upstream data. The configuration and control circuit 236 programs the write DMA controller 218 to include the destination address in a header field of the intermediate format for use by protocol bridge circuits. In some implementations, the configuration and control circuit 236, may also cause the switching network to route the intermediate formatted upstream data to a designated one of the plurality of protocol bridge circuits indicated by the control signal. Similarly, in some implementations the configuration and control circuit 236 is configured, in response to a second control signal, to cause the switch network (e.g., 110) to route all downstream data from a designated one of the plurality of protocol bridge circuits to the second input of the interface circuit.

The write DMA controller 218 and read DMA controller 220 may be configured by a configuration and control circuit 236 to provide read and write channels that operate independent of one another. The configuration and control circuit 236 may be implemented, for instance, using an AXI-MM communication port. Using the configuration and control circuit, the read and write DMA controller circuits 220 and 218, may be dynamically programmed to support various combinations of supported protocols as needed by the control/processing circuit. This feature is provided using the alternate streaming master interface 234 indicated above. When the alternate streaming master interface is enabled by the read channel controller 220, read requests are forwarded to the alternate streaming master interface 234 rather than the streaming master interface 230. Use of the primary and alternate master interfaces allows downstream data to be received from a first one of the protocol bridge circuits and converted to the raw format at the same time that upstream data is converted to the intermediate format and sent to a second one or more protocol bridge circuits.

As an example, the write DMA controller 218 can be programmed to send upstream data and write transaction request to a PCI Express protocol bridge using the streaming master interface 230. At the same time, the read DMA controller 220 can be programmed to retrieve data from an AXI4 protocol bridge circuit by forwarding read requests to the alternate streaming master interface 234.

Figures 1, 3:
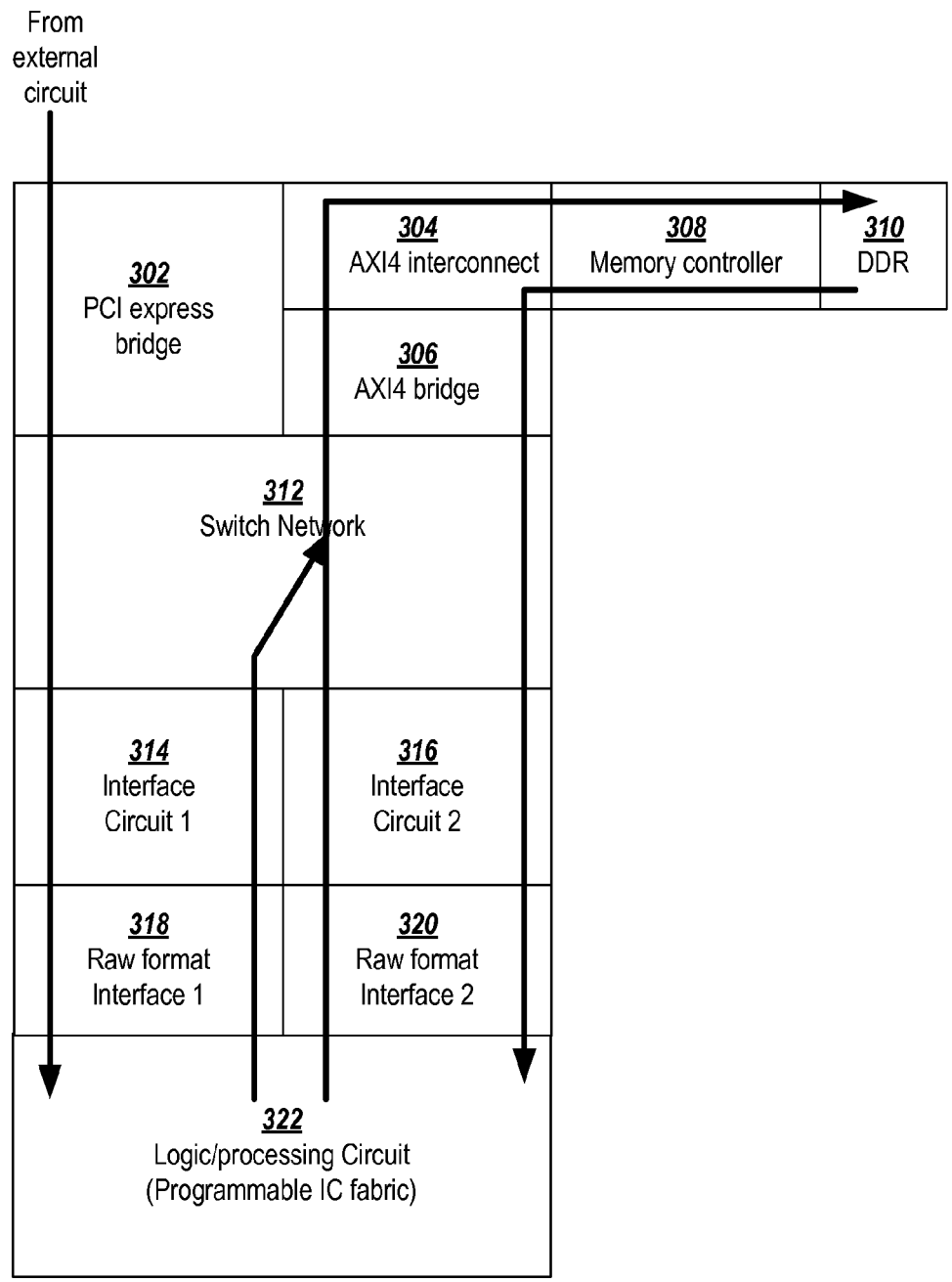
Figures 2, 3:
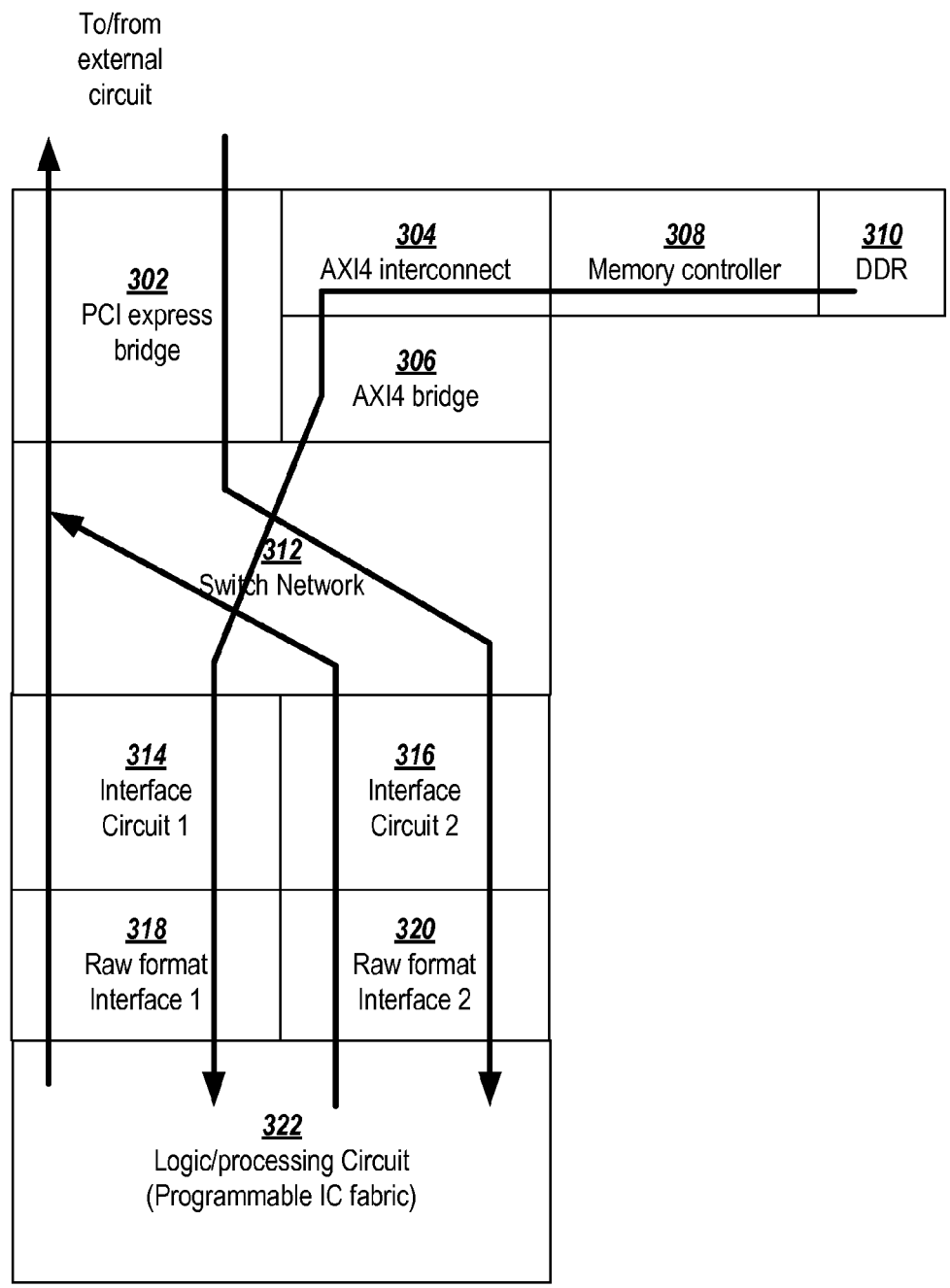

FIGS. 3-1 and 3-2 show example data flow scenarios for first and second protocol configurations of an example communication circuit, in accordance with one or more embodiments. In this example, the communication circuit includes two raw format streaming interfaces 318 and 320, which are provided to communicate data to and from a logic/processing circuit 322 that is implemented in programmable fabric of a programmable IC. For instance, AXI4 may be used to communicate between different logic/processing circuits of a system on a first bus, and the PCI Express protocol may be used to communicate between the logic/processing circuits and external devices connected to an I/O port of the system.

For each of the raw format interfaces 318 and 320, a respective interface circuit 314 and 316 is configured to convert data between a raw format and an intermediate format. In different configurations of the communication circuit, routing performed by the switch network 312 is adjusted to set the streaming interfaces 318 and 320 to communication with different destinations. In particular, the interface circuits (314 and 316) and a switch network 312 are configurable to send and receive data from different protocol bridge circuits. In this example, a PCI Express protocol bridge 302 is provided to convert between the intermediate format and a PCI Express format used to communicate with an external circuit or memory. An AXI4 bridge circuit is provided to convert between the intermediate format and an AXI4 format used for communication, via AXI4 interconnect 304, with a memory controller 308 of an internal memory 310. Because the data is communicated between the streaming interfaces and the protocol bridges in the intermediate format, the destination of communications from one of the streaming interfaces (e.g., 318) can be changed as required for a particular application without regard to the communication protocol used by the corresponding protocol bridge.

FIG. 3-1 shows a configuration of the communication circuit for a first application. In this example configuration, upstream data from the first raw format interface 318 is forwarded by the switch network 312 to the AXI4 bridge 306. Downstream data on the first raw format interface 318 is retrieved from the PCI Express bridge 302. Upstream and downstream data of the second raw format interface 320 is routed by the switch network 312 through the AXI4 bridge 306.

FIG. 3-2 shows a configuration of the communication circuit for a second application. In this example configuration, upstream data from the first raw format interface 318 is forwarded by the switch network 312 to the PCI Express bridge 302. Downstream data on the first raw format interface 318 is retrieved from the AXI4 bridge 306. Upstream data from the second raw format interface 320 is routed by the switch network 312 to the PCI Express bridge 302, and downstream data is retrieved from the PCI Express bridge 302.

As indicated above, in some embodiments a programmable IC may implement communication protocol bridge circuits, interface circuits, and/or the switching network as hardwired circuits in the programmable IC. However, in some embodiments, the protocol bridge circuits, interface circuits and/or the switching network may be implemented using programmable resources of the programmable IC. For such embodiments, HDL circuit designs or logic cores may be provided to a designer for different protocol bridge circuits and the interface circuit. Using the logic cores, a designer may generate a circuit design having the protocol bridge circuits and a number of instances of the interface circuit required by the circuit design. Because the logic circuit is configurable to operate with different communication protocols by routing data to different ones of the protocol bridge circuits, only one logic core is required for the interface circuit. This simple configuration scheme allows a designer to easily incorporate communication circuitry for different communication protocols into a circuit design. Using circuit design data in the logic cores, a computer aided design tool can generate configuration data (referred to as a configuration bitstream) that when programmed into programmable resources of a programmable IC causes the programmable IC to implement the desired protocol bridge circuits and desired number of interface circuits.

Figure 4:
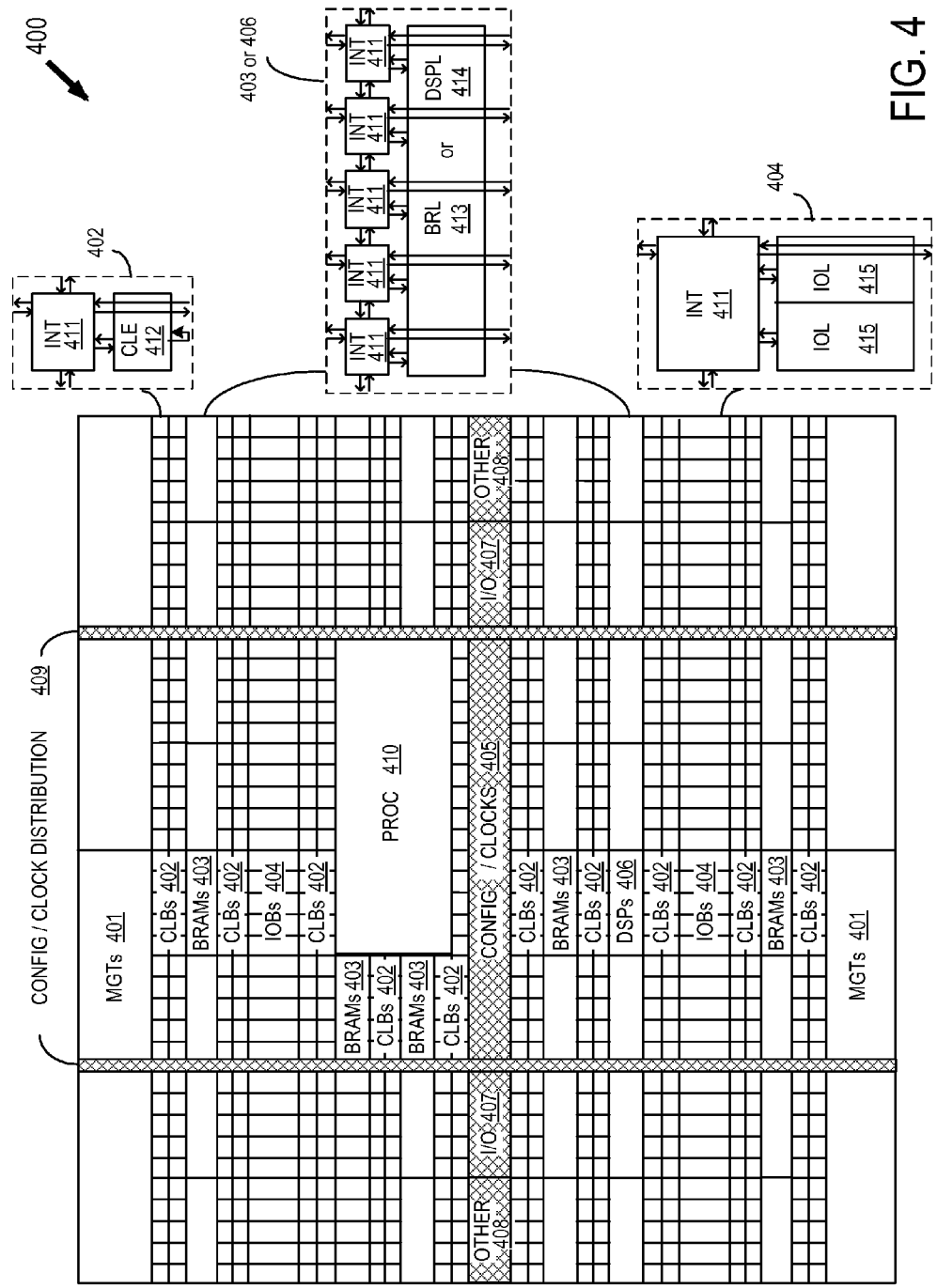
FIG. 4 shows a circuit diagram of an example programmable logic integrated circuit that may be configured to implement one of more data bus interfaces in accordance with one or more embodiments.

FIG. 4 is a block diagram of an example FPGA that may be configured to implement one or more data bus interface circuits in accordance with one or more embodiments. The data bus interface circuits may be implemented in programmable logic or using dedicated hardware. FPGAs can include several different types of programmable logic blocks in the array. For example, FIG. 4 illustrates an FPGA architecture (400) that includes a large number of different programmable tiles including multi-gigabit transceivers (MGTs 401), configurable logic blocks (CLBs 402), random access memory blocks (BRAMs 403), input/output blocks (IOBs 404), configuration and clocking logic (CONFIG/CLOCKS 405), digital signal processing blocks (DSPs 406), specialized input/output blocks (I/O 407), for example, clock ports, and other programmable logic 408 such as digital clock managers, analog-to-digital converters, system monitoring logic, and so forth. Some FPGAs also include dedicated processor blocks (PROC 410).

In some FPGAs, each programmable tile includes a programmable interconnect element (INT 411) having standardized connections to and from a corresponding interconnect element in each adjacent tile. Therefore, the programmable interconnect elements taken together implement the programmable interconnect structure for the illustrated FPGA. The programmable interconnect element INT 411 also includes the connections to and from the programmable logic element within the same tile, as shown by the examples included at the top of FIG. 4.

For example, a CLB 402 can include a configurable logic element CLE 412 that can be programmed to implement user logic plus a single programmable interconnect element INT 411. A BRAM 403 can include a BRAM logic element (BRL 413) in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 406 can include a DSP logic element (DSPL 414) in addition to an appropriate number of programmable interconnect elements. An IOB 404 can include, for example, two instances of an input/output logic element (IOL 415) in addition to one instance of the programmable interconnect element INT 411. As will be clear to those of skill in the art, the actual I/O pads connected, for example, to the I/O logic element 415 are manufactured using metal layered above the various illustrated logic blocks, and typically are not confined to the area of the input/output logic element 415.

In the pictured embodiment, a columnar area near the center of the die (shown shaded in FIG. 4) is used for configuration, clock, and other control logic. Horizontal areas 409 extending from this column are used to distribute the clocks and configuration signals across the breadth of the FPGA.

Some FPGAs utilizing the architecture illustrated in FIG. 4 include additional logic blocks that disrupt the regular columnar structure making up a large part of the FPGA. The additional logic blocks can be programmable blocks and/or dedicated logic. For example, the processor block PROC 410 shown in FIG. 4 spans several columns of CLBs and BRAMs.

Note that FIG. 4 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 4 are purely exemplary. For example, in an actual FPGA more than one adjacent column of CLBs is typically included wherever the CLBs appear, to facilitate the efficient implementation of user logic.

Those skilled in the art will appreciate that various storage devices may be suitable for storing configuration data for implementing the operations and structures described herein on a programmable integrated circuit. Such storage devices are processor readable, and programmable elements of the IC when programmed with the configuration data, operate consistent with the processes described herein. Other alternative embodiments may include a computing arrangement, including one or more processors and a memory arrangement configured with program code, would be suitable for hosting the processes and data structures of the different embodiments of the present invention.

The disclosed embodiments are thought to be applicable to a variety of communication protocols and applications. Other aspects and embodiments will be apparent to those skilled in the art from consideration of the specification and practice of the embodiments disclosed herein. It is intended that the specification and illustrated embodiments be considered as examples only, with a true scope and spirit of the invention being indicated by the following claims.

What is claimed is:

1. A circuit, comprising:
   a plurality of protocol bridge circuits including at least a first protocol bridge circuit and a second protocol bridge circuit, the first protocol bridge circuit configured to convert data between a first format and a second format, the second format corresponding to a first data bus protocol, and the second protocol bridge circuit configured to convert data between the first format and a third format, the third format corresponding to a second data bus protocol different from the first data bus protocol;
   a switch network coupled to the first and second protocol bridges; and
   one or more interface circuits, each configured to:
      convert upstream data received on a first data input of the interface circuit from a raw format into first format upstream data having the first format and forward the first format upstream data to a first output of the interface circuit that is coupled to the switch network; and
      convert downstream data received on a second input of the interface circuit that is coupled to the switch network from the first format to raw format downstream data having the raw data format and forward the raw format downstream data to a second output of the interface circuit;
   wherein each interface circuit includes a control circuit configured to signal, in response to a control signal indicating a destination address for the upstream data, the switching network to route the first format upstream data to a designated one of the plurality of protocol bridge circuits indicated by the control signal.

2. The circuit of claim 1, wherein the control circuit is further configured to generate write transaction requests to write the upstream data to the destination address indicated by the control signal.

3. The circuit of claim 1, wherein the control circuit is configured to, in response to a second control signal, signal the switching network to route all downstream data from a designated one of the plurality of protocol bridge circuits to the second input of the interface circuit.

4. The circuit of claim 1, wherein the one or more interface circuits includes a plurality of interface circuits.

5. The circuit of claim 1, wherein the switch network includes programmable routing resources of a programmable IC.

6. The circuit of claim 1, wherein one or more of the interface circuits is configured to concurrently perform the converting of the upstream data and the converting of the downstream data.

7. The circuit of claim 6, wherein the switch network is configured to route:
   upstream data from one of the one or more of the interface circuits to the first protocol bridge circuit; and
   downstream data from the second protocol bridge circuit to the one of the one of more of the one or more interface circuits.

8. The circuit of claim 7, wherein the one of the one or more interface circuits includes:
   first and second streaming master interface circuits coupled to the switch network;
   a write DMA control circuit configured to send write transaction requests for the upstream data to the first protocol bridge circuit using the first streaming master interface circuit; and
   a read DMA control circuit configured to send read transaction requests for the downstream data to the second protocol bridge circuit using the second streaming master interface circuit.

9. The circuit of claim 8, wherein the one of the one or more interface circuits is further configured to:
   send the upstream data to the first protocol bridge circuit using the first streaming master interface circuit; and
   receive the downstream data from the second protocol bridge circuit using a streaming slave interface circuit.

10. The circuit of claim 1, wherein the first data bus protocol is a PCI Express (PCIe) protocol and the second data bus protocol is an AXI protocol.

11. A programmable integrated circuit (IC), comprising:
    a plurality of programmable resources;
    a plurality of programmable routing resources for intercoupling the programmable resources;
    a plurality of protocol bridge circuits including at least a first protocol bridge circuit and a second protocol bridge circuit, the first protocol bridge circuit configured to convert data between a first format and a second format, the second format corresponding to a first data bus protocol, and the second protocol bridge circuit configured to convert data between the first format and a third format, the third format corresponding to a second data bus protocol different from the first data bus protocol;

a switch network coupled to the first and second protocol bridges; and a plurality of interface circuits coupled to the programmable resources and to the programmable routing resources, each of the plurality of interface circuits configured to:

convert upstream data received on a first data input of the interface circuit from a raw format into first format upstream data having the first format and forward the first format upstream data to a first output of the interface circuit that is connected to the switch network; and convert downstream data received on a second input of the interface circuit that is connected to the switch network from the first format to raw format downstream data having the raw data format and forward the raw format downstream data to a second output of the interface circuit one or more of the interface circuits is configured to simultaneously perform the converting of the upstream data and the converting of the downstream data; and the switch network is configured to route:

upstream data from one of the one or more interface circuits to the first protocol bridge circuit; and downstream data from the second protocol bridge circuit to the one of the one of more interface circuits.

12. The programmable IC of claim 11, wherein the plurality of protocol bridge circuits and the plurality of interface circuits are hardwired circuits in the programmable IC.

13. The programmable IC of claim 12, wherein the switch network includes one or more of the plurality of programmable routing resources.

14. The programmable IC of claim 11, wherein each interface circuit includes a control circuit configured to signal, in response to a control signal indicating a destination address for the upstream data, the switching network to route the first format upstream data to a designated one of the plurality of protocol bridge circuits indicated by the control signal.

15. The programmable IC of claim 14, wherein the control circuit is further configured to:

generate write transaction requests to write the upstream data to the destination address indicated by the control signal; and in response to a second control signal, signal the switching network to route all downstream data from a designated one of the plurality of protocol bridge circuits to the second input of the interface circuit.

16. The programmable IC of claim 11, wherein the one of the one or more interface circuits includes:

first and second streaming master interface circuits coupled to the switch network;

a write DMA control circuit configured to send write transaction requests for the upstream data to the first protocol bridge circuit using the first streaming master interface circuit; and a read DMA control circuit configured to send read transaction requests for the downstream data to the second protocol bridge circuit using the second streaming master interface circuit.

17. The programmable IC of claim 16, wherein the one of the one or more interface circuits is further configured to:

send the upstream data to the first protocol bridge circuit using the first streaming master interface circuit; and receive the downstream data from the second protocol bridge circuit using a streaming slave interface circuit.

18. A method, comprising:

converting first data in a first raw format into upstream data in a first format;

routing, through a switching network and in response to a control signal indicating a destination address for the upstream data, the upstream data in the first format to a particular one of a plurality of protocol bridges indicated by the destination address;

converting, using the particular protocol bridge, the upstream data in the first format into first protocol data in a second format, the second format corresponding to a first data bus protocol;

converting, using another protocol bridge, a second protocol data in a third format into downstream data in the first format, the third format corresponding to a second data bus protocol different from the first data bus protocol; and converting the downstream data in the first format into second data in a second raw format.

* * * * *